United States Patent
Olschewski (10) Patent No.: US 7,006,675 B2
(45) Date of Patent: Feb. 28, 2006

(54) METHOD AND ARRANGEMENT FOR CONTROLLING ANALYTICAL AND ADJUSTMENT OPERATIONS OF A MICROSCOPE AND SOFTWARE PROGRAM

(75) Inventor: Frank Olschewski, Heidelberg (DE)

(73) Assignee: Leica Microsystems CMS GmbH, Wetzlar (DE)

(*) Notice: Subject to any disclaimer, the term of this patent is extended or adjusted under 35 U.S.C. 154(b) by 422 days.

(21) Appl. No.: 09/682,329

(22) Filed: Aug. 21, 2001

(65) Prior Publication Data

US 2002/0090118 A1 Jul. 11, 2002

(30) Foreign Application Priority Data

Aug. 21, 2000 (DE) .................. 100 41 165

(51) Int. Cl.
G06K 9/00 (2006.01)
(52) U.S. Cl. ............ 382/128; 382/282; 382/298; 382/299
(58) Field of Classification Search ........ 382/128, 382/282, 298, 299; 345/634, 781; 348/79; 358/1.18; 250/201.3, 201.2, 458.1, 459.1; 356/71, 317
See application file for complete search history.

(56) References Cited

U.S. PATENT DOCUMENTS

| | | | |
|---|---|---|---|
| 4,672,559 A * | 6/1987 | Jansson et al. | 382/128 |
| 4,803,358 A * | 2/1989 | Kato et al. | 250/310 |
| 6,172,349 B1 * | 1/2001 | Katz et al. | 250/201.3 |
| 6,300,639 B1 * | 10/2001 | Wiederhoeft | 250/458.1 |
| 6,833,911 B1 * | 12/2004 | Lizotte | 356/71 |

FOREIGN PATENT DOCUMENTS

| | | |
|---|---|---|
| DE | 4330347 A1 | 3/1995 |
| DE | 19902625 A1 | 9/1999 |
| DE | 19959184 A1 | 6/2000 |
| EP | 0740179 A1 | 10/1996 |
| EP | 1 061 551 A2 | 12/2000 |
| GB | 2346755 | 8/2000 |
| WO | WO95/07447 | 3/1995 |
| WO | WO 01/35325 A1 | 5/2001 |

OTHER PUBLICATIONS

Li et al., "Three-Dimensional Reconstruction of Microscope Images", IEEE Canadian Conference on Electrical and Computer Engineering, Sep. 1993, vol. 2, pps. 1013-1016.*
Hagedorn et al., "A System for Measuring Surface Facet Orientation from Atomic Force Microscope Data", IEEE Proceedings Oct. 1996, pps. 397-400, 508.*

(Continued)

Primary Examiner—Anh Hong Do
(74) Attorney, Agent, or Firm—Houston Eliseeva LLP (57) ABSTRACT

The present invention concerns a method, an arrangement, and a software program for controlling analytical and adjustment operations of a microscope. The arrangement has an electronic acquisition system (50) which converts the electrical signals coming from the detectors (19) into digital signals and preprocesses them. A PC (34) receives the digital signals from the electronic acquisition system (50) and identifies from the digital signals a graphical depiction. On a display (27), the graphical depiction is displayed and moreover the user is offered the opportunity to select adjustment functions. An input unit (33), with which selection of the adjustment functions and selection of at least one structure of interest can be achieved, is provided for selection. An electronic control system (67), with which the adjusting elements of the microscope can be controlled, is connected to the PC (34).

10 Claims, 4 Drawing Sheets

OTHER PUBLICATIONS

Wedekind, P., et al., "*Scanning microphotolysis: a new photobleaching technique based on fast intensity modulation of a scanned laser beam and confocal imaging,*" Journal of Microscopy, vol. 176, Pt 1, Oct. 1994, pp. 23-33.

Demandolx, et al., "*Multicolour analysis and local image correlation in confocal microscopy,*" Journal of Microscopy, vol. 185, Pt. 1, Jan. 1997, pp. 21-36.

* cited by examiner

METHOD AND ARRANGEMENT FOR CONTROLLING ANALYTICAL AND ADJUSTMENT OPERATIONS OF A MICROSCOPE AND SOFTWARE PROGRAM

CROSS REFERENCE TO RELATED APPLICATIONS

This application claims priority of the German patent application 100 41 165.7, filed Aug. 21, 2000, which is incorporated by reference herein.

BACKGROUND OF THE INVENTION

The invention concerns a method for controlling analytical and adjustment operations of a microscope. The invention further concerns an arrangement for controlling analytical and adjustment operations of a microscope that has multiple detectors for converting optical signals into electrical signals. In addition, the invention concerns a software program on a data medium and is utilized to control analytical and adjustment operations of a microscope.

When work is performed at a microscope, image details (which differ according to the application) keep appearing in the user's field of view. In present-day systems, the user analyzes these image details during measurement, marks them with a suitable graphical mechanism on the screen, and selects the desired function.

A few examples of such actions are: a) statistical analysis of local properties of images and volumetric image stacks (profiles, histograms, co-localizations, material roughness); b) observation of physiological reactions of living cells and individual compartments (parts of a cell distinguishable in terms of metabolism/structure) thereof; c) zoom operations; d) alignment of the image field; e) control of actuators; f) definition of locally differing excitation and detection parameters; and g) automated control operations with the aid of geometry data. Standard microscope systems make available for this purpose appropriate geometry models (polygons, rectangles, in general "regions of interest" (ROIs)) which the user defines. This usually requires a time-consuming interactive process. The region is drawn with the mouse on the display of a computer system. It is then made available to the corresponding automation function.

The publication of P. Wedekind, U. Kubitschek, and R. Peters: Scanning microphotolysis: a new photobleaching technique based on fast intensity modulation of a scanned laser beam and confocal imaging, in Journal of Microscopy, Vol. 176, Pt. 1, October 1994, pp. 2333, discloses a capability for superimposing geometric elements on an acquired image of a specimen. The geometric elements are, for example, circles, ellipses, polygons, or rectangles. These regions defined in this fashion are differently illuminated on the sample, and because of the energy transport associated therewith, bring about changes in the sample.

The publication of D. Demandolx and J. Davoust, Multicolor analysis and local image correlation in confocal microscopy, in Journal of Microscopy, Vol. 185, Pt. 1, January 1987, pp. 2136, discloses a plurality of analytical methods in scanning microscopy. The individual analyses require both a geometric selection of the specimen to be analyzed and geometric selections in a specific analytical space (the cytofluorogram). The publication does not, however, propose any capability for marking specific sample regions for analysis. On the other hand, as will be made clear below, the analyses offer the capability of finding geometries.

SUMMARY OF INVENTION

The object of this invention is a method in which the image analysis of acquired microscope images is simplified and is automated to a very large extent. It is characteristic that the analytical and adjustment operations of the microscope make do with a minimum of user inputs.

The aforesaid object is achieved by a method for controlling analytical and adjustment operations of a microscope, comprising the following steps:
depicting a data set in graphical form on a display associated with the microscope;
selecting at least one position in the graphical form of the data set that depicts an image of the specimen;
identifying automatically a region from the data set and the selected position; and
performing an analytical or adjustment operation or both.

A further object of the invention is to create an arrangement in which the image analysis of acquired microscope images, and system parameterization, are simplified and are automated to a very large extent.

The aforesaid object is achieved by an arrangement for controlling analytical and adjustment operations of a microscope comprising: multiple detectors for converting optical signals into electrical signals; an electronic acquisition system, which converts the electrical signals coming from the detectors into digital signals and preprocesses them, is provided;
a PC, which receives the digital signals from the electronic acquisition system and identifies from the digital signals a graphical depiction which corresponds to an image of the specimen;
a display, which reproduces the graphical depiction and moreover offers selectable adjustment functions to the user, is connected to the PC;
an input unit is provided for choosing the adjustment functions and selecting at least one structure of interest in the image of the specimen; and
an electronic control system, with which the adjusting elements of the microscope are be controlled, is connected to the PC.

A further object of the invention is to make available a software program which makes it possible for the an arrangement to be caused to function in such a way that the image analysis of acquired microscope images is simplified and is automated to a very large extent.

This object is achieved by a software program for controlling analytical and adjustment operations of a microscope, wherein the following processes are carried out:
depicting a data set in graphical form on a display associated with the microscope;
selecting at least one position in the graphical form of the data set that depicts the image of the specimen;
identifying automatically a region from the data set and the selected position; and
performing an analytical or adjustment operation or both.

The advantage of the invention is that the interaction between the user and the microscope is limited to a minimum, but that rapid, good-quality results are nevertheless produced. The advantage lies in the coupling between the interaction of the input unit (in which context the input unit can be a mouse, keyboard, or even voice input) and the specific image analysis (segmentation). In this fashion, an automated function can identify what the user wants. A further advantage is that an extremely fast and ergonomic coarse adjustment of the microscope system is achievable. Added to this is an improvement in system ergonomics, since interactions that previously were very complex are reduced to one or two mouse clicks (or other inputs).

Independence of the dimensionality of the geometry model is an additional advantage. The method described is independent of the dimensionality of the geometry model. In principle, it is possible (although only theoretically relevant) even for n-dimensional models. In practice, however, three-dimensional geometries are important. The drawing of three-dimensional models is difficult for a user, but can be performed in a practical and automatic fashion by means of the proposed method.

This invention is characterized by the combined evaluation of minimal user inputs (mouse click) and the sensed microscope image data to identify geometry models by pattern recognition, and the use thereof for system parameterization.

The automation of image analysis by embedding pattern recognition processes into the concept of a microscope system is based on the principle that individual image parts (cells, compartments, materials) within a region to be examined have the property of being locally delimited from the image environment. For example, homogeneous fluorescent specimens are delimited from a homogeneous dark background; and homogeneous fluorescent specimens are delimited from the compartments in the environment by way of the measured intensity distribution. The local statistics within the compartments is different. For applications with multiple fluorescent dyes, it is advantageous to use the multivariate spectral intensity distribution. In addition, specimens in a transmitted image are darker than everything else. These image properties cover most relevant user needs. A further property of the adjustment operations is that coarse geometries are usually sufficient, or mere classes of geometries (images are always rectangles) are permissible. The sum of all the properties can be used to automatically detect image details, convert them into geometry models, and transfer them to the microscope control system.

As a rule, pattern recognition processes work satisfactorily (in 90% of all cases) only up to a certain accuracy. This disadvantage is not relevant for the present invention, since only coarse adjustments are necessary. All the adjustment operations of the microscope system can optionally also be completed and refined manually (using the old method). The pattern recognition process thus offers the alternative of a rapid coarse adjustment that can be refined as necessary. This procedure functions very quickly and automatically, and in general is already sufficient for many applications.

BRIEF DESCRIPTION OF DRAWINGS

The subject matter of the invention is depicted schematically in the drawings and will be described below with reference to the Figures, in which.

DETAILED DESCRIPTION

Figure 1:
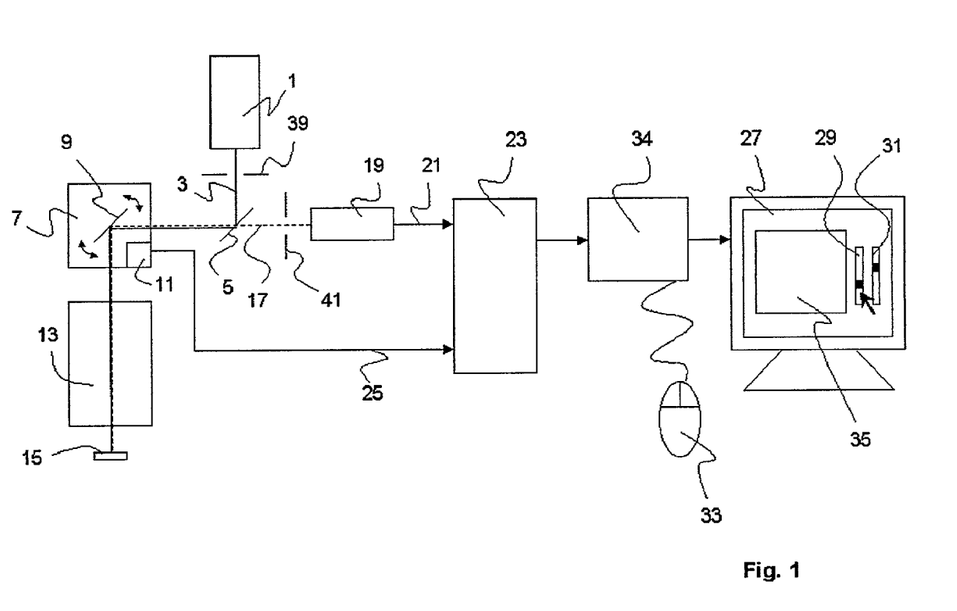
FIG. 1 is a schematic depiction of a confocal microscope using the present invention.

FIG. 1 schematically shows a confocal scanning microscope. Light beam 3 coming from an illumination system 1 is reflected by a beam splitter 5 to scanning module 7, which contains a gimbal-mounted scanning mirror 9 that guides the beam through microscope optical system 13 over or through specimen 15. In the case of non-transparent specimens 15, light beam 3 is guided over the specimen surface. With biological specimens 15 (preparations) or transparent specimens, light beam 3 can also be guided through specimen 15. This means that different focal planes of the specimen are successively scanned by light beam 3. Subsequent assembly then yields a three-dimensional image of the specimen. Light beam 3 coming from illumination system 1 is depicted as a solid line. Light 17 proceeding from specimen 15 passes through microscope optical system 13 and via scanning module 7 to beam splitter 5, passes through the latter and strikes detector 19, which is embodied as a photomultiplier. In all the illustrations (FIGS. 1 through 3), light 17 proceeding from specimen 15 is depicted as a dashed line. In detector 19, electrical detection signals 21 proportional to the power level of light 17 proceeding from the specimen are generated, and are forwarded to processing unit 23. Position signals 25, detected in the scanning module by means of an inductively or capacitatively operating position sensor 11, are also transferred to processing unit 23. It is self-evident to one skilled in the art that the position of scanning mirror 9 can also be identified by way of the actuation signals. The incoming analog signals are first digitized in processing unit 23. The signals are transferred to a PC 34 to which an input unit 33 is connected. By means of input unit 33, the user can make corresponding selections with regard to processing of the data. In FIG. 1, a mouse is depicted as an input unit 33. It is self-evident to one skilled in the art, however, that a keyboard and the like can also be used as input unit 33. An image 35, for example, of specimen 15 is depicted on a display 27. In addition, adjusting elements 29, 31 for image acquisition are also depicted on display 27. In the embodiment shown here, adjusting elements 29, 31 are depicted as sliders. Any other embodiment is within the specialized ability of one skilled in the art. PC 34 forwards the corresponding data via line 37 to processing unit 23. The position signals and detection signals are assembled in processing unit 23 as a function of the particular settings selected, and displayed on display 27. Sliders 29, 31 are referred to as "adjusting elements." The form in which the adjusting elements are depicted on display 27 is immaterial in terms of the invention. Illumination pinhole 39 and detection pinhole 41 that are usually provided in a confocal scanning microscope are shown schematically for the sake of completeness. For better clarity, however, certain optical elements for guiding and shaping the light beams are omitted. These are sufficiently familiar to one skilled in this art.

Figure 2:
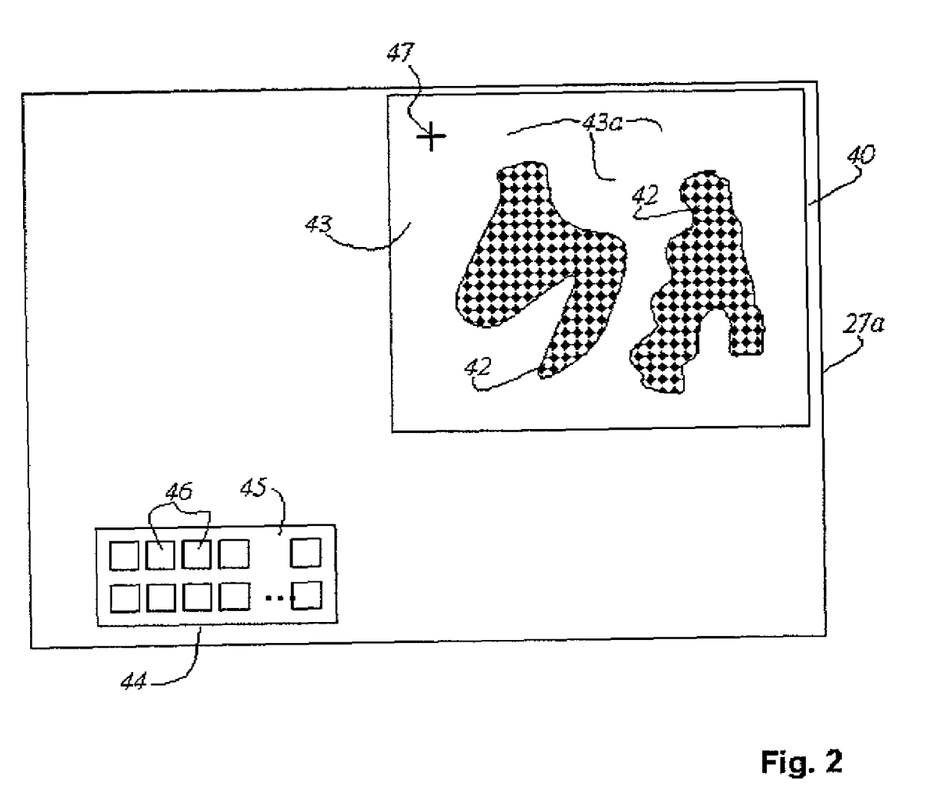
FIG. 2 is a specific embodiment of the screen layout regarding the structures of interest for the examination, and regarding possible user inputs.

One possible form of the screen depiction is shown in FIG. 2. Display 27 defines a screen edge 27a. A first region 40, in which image 43 of specimen 15 is depicted for the user, is defined on display 27. The image of specimen 27 usually comprises at least one structure 42 that is clearly distinguished from a background 43a. Depicted in a second region 44 on display 27 is a panel box 45 with which various functions can be selected by the user. Each of the selectable functions has a click button 46 associated with it. The cursor is depicted on display 27 by, for example, a crosshairs. The user can call the desired function, for example, with the cursor. In addition, the user can also use the cursor to select the desired structure 42 of specimen 27.

There are a number of different and independent implementation capabilities which have substantially the same effect. These may be adapted to specific cases, where they offer advantages. The general construction of a mechanism for a method of this kind comprises a sequential chain of processing units, for example an apparatus for adjusting the automation function, mouse click detection, adaptation of data to system capacity (which can also be optional), pre-processing, adaptation to the human visual system, segmentation, generation of the geometry model from the binarized image, conversion into the required geometry model, and routing unit for distributing the geometry model among the system components of the microscope. The individual processing units will be explained briefly below.

Apparatus for Adjusting the Automation Function

This is (generally) accomplished by way of software in PC 34 of the microscope system.

Mouse Click Detection

This is accomplished by way of software in PC 34 of the microscope system, but coordinate input using panel box 45 and a crosshairs 47 on display 27 is also conceivable.

Adaptation of Data to System Capacity (Optional)

Downsampling of the image is advisable. The purpose of this is to limit calculation times for the automatic functions described below. An artificial compromise between calculation time and the accuracy of the geometry model is imposed. This compromise is still necessary at the present state of the art. Processing and reaction times are made tolerable for the user.

The sampling accuracy can be adapted to the specific task at hand and can possibly also be eliminated as the performance of existing electronic components increases. This is necessarily the first effective step toward reducing calculation time. Downsampling usually comprises two stages: a) a band limiting filter, and b) a reduction step that passes on only every second, fourth, eighth, etc. pixel. These two stages are coupled to one another. The rate at which the image is downsampled is preferably controlled externally (software) and adapted to the particular application. Suitable filters include all phase-preserving lowpass filters that result in limitation of the spatial frequency to the resolution of the reduced image. Examples include averaging, binominal, Gaussian, or wavelet-based filters. These operations can be achieved with discrete digital electronics, FPGA, and/or digital computers or software.

Preprocessing

The goal is image filtering, for substantial improvement of the signal-to-noise conditions within the scene. Any lowpass filter (preferably phase-preserving) is once again suitable for this filtration (averaging, binominal, Gaussian, wavelet-based; see Adaptation of data to system capacity). Nonlinear morphological filters can also be used. This item is necessary because confocal image data are noisy. Signal smoothing with an "anisotropic diffusion" filter is also conceivable. Such mechanisms belong to the existing art and can be implemented with discrete digital electronics, FPGA, and/or digital computers or software.

Adaptation to the Human Visual System

The human eye has a logarithmic sensitivity to light stimuli. To make the limits of the geometry model coincident with those perceived by the eye, it is advisable to transform the image data with a similar logarithmic characteristic curve by way of a suitable amplitude transformation. If this item is omitted, the structure perceived by the automation system and the human observer will be different.

Segmentation

Segmentation of the image into regions has a very large number of degrees of freedom. Because of its complexity, the general principle will be explained briefly here. The general goal of segmentation tasks is to divide the image, defined by a first region 40 on display 27, into different regions and which is substantially a purely mathematical formalism.

In formal terms, a homogeneity dimension Y is always defined, assigning a value Y(I, R) to each region R and to the image I. On the basis of this model, what is sought out of all the possibilities is then a partition $\{R_1, R_2, \ldots R_N\}$ where $R_1 \cup R_2 \cup \ldots \cup R_N$=image area and $R_1 \cap R_2 \cap \ldots \cap R_N = \{\}$(empty set) and with the property $\Sigma_i Y(I, R_i)$=minimum or equivalently, depending on the homogeneity dimension selected:

$\Sigma_i Y(I, R_i)$=maximum.

There are two reasons for the great variety of different possibilities: The homogeneity dimension Y is selected appropriately for the task at hand. Because of the large number of search possibilities, many heuristics are used to simplify the search. For this reason, there are several different methods for performing this task.

In the context described here, the segmentation task is substantially simplified by the additional a priori knowledge, imparted by the user by way of the mouse click, as to which parts of the image are of interest. For this reason, the segmentation procedure described here can turn out to be much simpler than conventional segmentation approaches cited in the literature. Essentially all that is necessary is to find a region R which contains the position of crosshairs 47 at the moment of the mouse click, and for which the statement $Y(I, R)$=minimum is valid. This can be achieved, in practice, by a relatively fast local search in the vicinity of the marked position. With a suitably selected homogeneity dimension, an algorithm of this kind finds the structure desired by the user. Several options will be discussed below, with no uniform definition of one specific method for all adjustment methods.

Option 1

For Fluorescent Images from One Spectral Band.

The histogram of the image or image region must be examined for several threshold values. This yields a homogeneity dimension dependent only on the intensities. In this application, a trimodal distribution and three intensity regions may be expected. Nominally these are: regions darker than the intensity at the position of crosshairs 47 at the moment of the mouse click; regions brighter than the intensity at the position of cross hairs 47 at the moment of the mouse click; and regions approximately equal in brightness to the intensity at the position of crosshairs 47 at the moment of the mouse click. These regions in the histogram must be discovered (by brute force or heuristically). In a one-dimensional context, useful methods here are discriminance analysis, cluster analysis, clustering neural networks, Otsu variance minimization, minimization of the Kullback information distance, or maximization of local entropy.

The search must be conducted recursively until the desired trimodality is or is not detected. The homogeneity dimension can be constructed by a simple interval comparison, and can result directly in a binarized image that contains only the regions.

This variant based on maximization of local entropy could, for example, be implemented in conjunction with a multi-band detector, allowing the generation of regions of interest (ROIs) for purely analytical purposes to function satisfactorily. A multi-band detector has already been disclosed in DE 43 30 347 and DE 199 02 625.4. This method can be implemented in FPGAs, digital computers, or software.

Option 2

For Fluorescent Images with Multiple Spectral Bands (Channels).

Multivariate histograms are referred to in Leica jargon as "cytofluorograms" and are disclosed, for example, in the publication of D. Demandolx and J. Davoust, Multicolor analysis and local image correlation in confocal microscopy, in Journal of Microscopy, Vol. 185, Pt. 1, January 1887, pp. 2136. These can also be used for purposes of ROI discovery. The same mechanism as above can be generated by abandoning the trimodality assumption in the three-dimensional context and by further extending the recursive search. This can be implemented in large FPGAs and in software.

Option 3

For Fluorescent Images with Multiple Spectral Bands (Channels).

Good results are also obtained by simply reducing the intensities to the signal energy and then applying Option 1. This is also already implemented in TCS SP2 (True Confocal Scanner Spectrophotometer 2).

Option 4

Utilization of Arbitrary Segmentation Algorithms.

Based on each arbitrary segmentation algorithm, it is of course possible to use, from the multiplicity of regions, one suitable one that contains the marked position. The quality and implementability of this method depends very strongly on the application and the method itself.

Option 5

Spectra.

With multivariate factorial statistics (principle component analysis) and energy considerations, it is also possible to simplify spectral images and prepare them for the options outlined above.

Generation of the Geometry Model from the Binarized Image

For all adjustment operations, the outer envelope of the region discovered under "Segmentation" is needed. Algorithms of this kind are sufficiently familiar to those skilled in the art. As a rule, this envelope is extracted from the binarized image by "contour following" algorithms. This is advantageously done by a digital computer. Alternatives are "scan line"-based algorithms that are also FPGA-compatible. The necessary regions discovered in this fashion can be further refined using many mechanisms such as active contours or "snakes." Software according to the existing art must be used for this purpose.

Conversion into the Required Geometry Model

Adaptations are occasionally necessary. For example, a zoom function of a microscope can generate only rectangular images. For star-shaped geometries, the enclosing rectangle must therefore first be determined.

Figure 3:
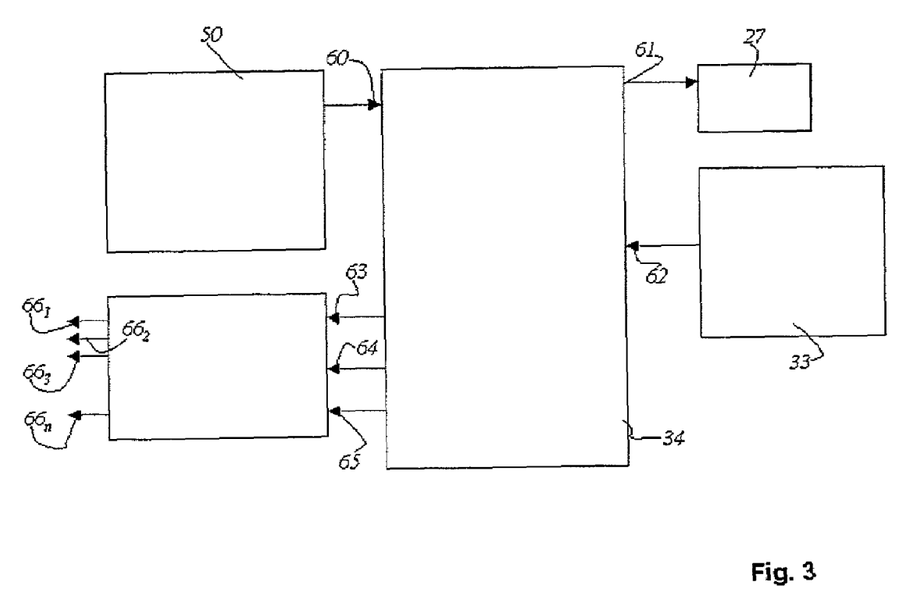
FIG. 3 schematically depicts all the electronics of a microscope system necessary for image acquisition, image analysis, and image depiction.

The electronic portion of a confocal microscope is depicted in FIG. 3. The central unit of the electronic portion of a confocal microscope is PC 34. By way of a first input 60, PC 34 receives the data generated by an electronic acquisition system 50. These data correspond to the optical signals acquired by detectors 19 (see FIG. 4). Via a first output 61, PC 34 activates a display 27 on which the image data (as shown in FIG. 2) are depicted. Input unit 33 is connected via a second input 62 to PC 34. As already described above, input unit 33 can be a mouse, a conventional keyboard, or even a voice input. By means of input unit 33, functions (see FIG. 2) and also the position of structure 42 of interest are selected. PC 34 furthermore possesses a second, third, and fourth output 63, 64, and 65 which are connected to an electronic control system 67. Second output 63 supplies information about the geometry model to electronic control system 67. Third output 64 supplies information for further control signals, and fourth output 65 supplies information about the function selection that was made using panel box 45 of FIG. 2. Electronic control system 67 possesses multiple outputs $66_1$, $66_2$ . . . $66_n$ that supply corresponding control signals to microscope components in order to obtain correct and suitable image acquisition in terms of the selection made by the user. The tasks of the addressed microscope components are: direct/do not direct illumination onto the specimens, modulate the illumination intensity, scanning speed, set wavelength region selected for image acquisition, control laser beam deflection, zoom, image centering, detection sensitivity, illuminating light output, spectral composition of the illumination, polarization of the illumination, spectral detection of the identified region, and rotation of the identified region.

Figure 4:
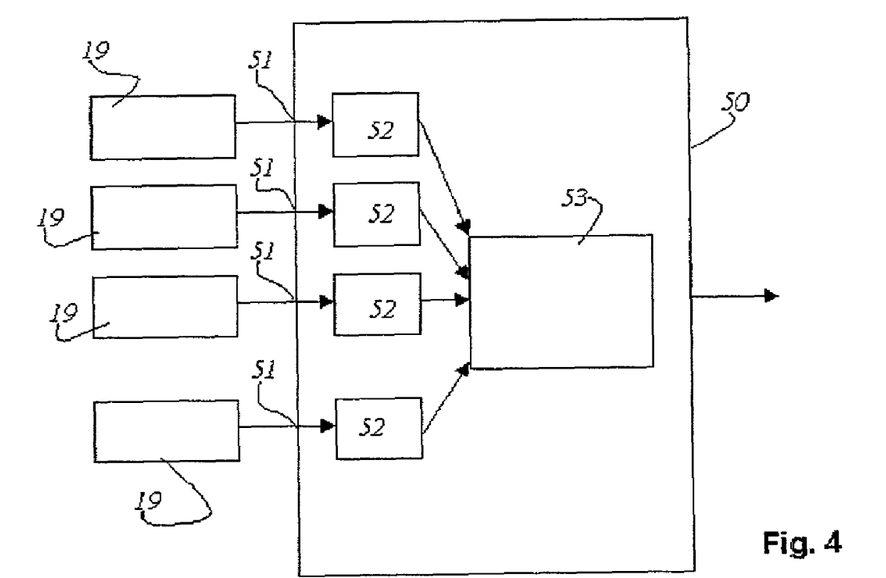
FIG. 4 schematically depicts the acquisition of image data and a possible data pre-processing function.

FIG. 4 schematically depicts the acquisition of image data and possible data preprocessing. An electronic acquisition system 50 converts the optical signals into electrical signals. Electronic acquisition system 50 possesses multiple inputs 51 through which the analog electrical signals corresponding to the optical signals are transferred to electronic acquisition system 50. Each of inputs 51 has a detector 19 associated with it. In a particular embodiment, detector 19 can be a photomultiplier. Detectors 19 each receive light of one wavelength. Similarly, each of inputs 51 has associated with it an analog/digital converter 52 which converts the electrical signals coming from the detectors into corresponding digital signals. Downstream from analog/digital converters 52 is an electronic circuit 53 that can further process the digital data as already described above.

Figure 5:
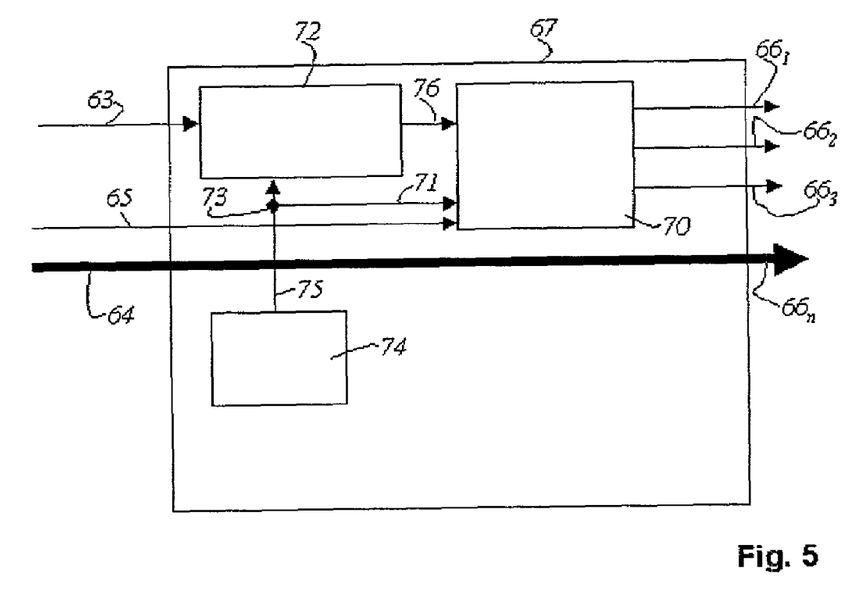
FIG. 5 depicts the electronic control system with which individual microscope elements can be controlled.

FIG. 5 describes the configuration of electronic control system 67 of FIG. 3. As already mentioned above, second output 63 supplies information about the geometry model to electronic control system 67. Electronic control system 67 comprises a memory 72 that serves as buffer memory for the geometric region information. Electronic control system 67 is also equipped with a pixel clock that has an output 75. Output 75 goes to memory 72 and to a branching point 73; the pixel clock pulse also arrives via a line 71 at a routing unit 70 provided in electronic control system 67. A pixel-synchronized distribution of the control signals to the control elements of the microscope is thereby guaranteed. Third output 64 supplies information for further control signals, by which electronic control system 67 is not influenced. These signals are correspondingly forwarded via outputs $66_4$, $66_5$ through $66_n$.

Routing unit 70, which obtains data directly from fourth output 65, is provided in electronic control system 67. Routing unit 70 has multiple outputs which correspond to outputs $66_1$, $66_2$, and $66_3$ of electronic control system 67. As already mentioned, routing unit 70 receives the geometry data via a line 76 from memory 72. The pixel clock pulse comes via line 71. The data arriving in routing unit 70 are correlated using appropriate algorithms, and the control elements of the microscope are then activated directly via outputs $66_1$, $66_2$, and $66_3$.

The present invention was described with reference to a particular embodiment. It is nevertheless self-evident that changes and modifications can be made without thereby leaving the range of protection of the claims recited hereinafter.

The invention claimed is:

1. A method for controlling analytical and adjustment operations of a microscope, comprising the following steps:
   depicting a data set in graphical form on a display associated with the microscope;
   selecting at least one position in the graphical form of the data set that depicts an image of the specimen;
   identifying automatically a region from the data set and the selected position;
   selecting an adjustment function for execution of an adjustment operation, wherein the adjustment operation modifies at least one image sensing parameter and the image sensing pararmeters consist essentially of zoom, image centering, detection sensitivity, illuminating light output, spectral composition of the illumination, polarization of the illumination, spectral detection of the identified region, and rotation of the identified region; and
   performing an analytical or adjustment operation or both on a structure of interest, wherein the analytical operation is based on the geometry of the structure of interest or on the data set of the structure of interest determined by means of pattern recognition.

2. The method as defined in claim 1, comprising the steps:
   focusing automatically of a structure of interest within the identified image of the specimen; and
   centering the structure of interest within the image of the specimen.

3. An arrangement for controlling analytical and adjustment operations of a microscope comprising:
   multiple detectors for converting optical signals into electrical signals;
   an electronic acquisition system, which converts the electrical signals coming from the detectors into digital signals and preprocesses them;
   a PC, which receives the digital signals from the electronic acquisition system and identifies from the digital signals a graphical depiction which corresponds to an image of the specimen;
   a display, which reproduces the graphical depiction and offers selectable adjustment functions to the user, is connected to the PC wherein the adjustment functions are selected for execution of an adjustment operation, wherein the adjustment operation modifies at least one image sensing parameter and the image sensing parameters consist essentially of zoom, image centering, detection sensitivity, illuminating light output, spectral composition of the illumination, polarization of the illumination, spectral detection of the identified region, and rotation of the identified region;
   an input unit is provided for choosing the adjustment functions and selecting at least one structure of interest in the image of the specimen; and
   an electronic control system, which receives information about geometry models identified by a pattern recognition process, with which electronic control system the adjusting elements of the microscope are to be controlled, is connected to the PC, wherein the arrangement is adapted to the automatic focusing of the structure of interest within an identified image of the specimen.

4. The arrangement as defined in claim 3, wherein the electronic control system has a memory that serves for temporary storage of the at least one structure of interest and is connected via a line to a routing unit; and a pixel clock is in communication both with the memory and with the routing unit.

5. The arrangement as defined in claim 4, wherein the routing unit has multiple outputs by way of which the microscope is controllable.

6. The arrangement as defined in claim 3, wherein the electronic acquisition system has multiple analog/digital converters that are connected to an electronic circuit.

7. The arrangement as defined in claim 6, wherein the electronic circuit is configured as an FPGA.

8. The arrangement as defined in claim 3, wherein the adjustment functions are arranged on the display in a panel box in the form of multiple click buttons.

9. A computer readable medium includes software program on a data carrier for controlling analytical and adjustment op of a microscope, wherein the following processes are carried out:
   depicting a data set in graphical form on a display associated with the microscope;
   selecting at least one position in the graphical form of the data set that depicts the image of the specimen;
   identifying automatically a region from the data set and the selected position;
   selecting an adjustment function for execution of an adjustment operation wherein the adjustment operation modifies at least one image sensing parameter and the image sensing pararmeters consist essentially of zoom, image centering, detection sensitivity, illuminating light output, spectral composition of the illumination, polarization of the illumination, spectral detection of the identified region, and rotation of the identified region; and
   performing an analytical or adjustment operation or both on a structure of interest, wherein the analytical operation is based on the geometry of the structure of interest or on the data set of the structure of interest determined by means of pattern recognition.

10. The computer readable medium as defined in claim 9, comprising:
   automatic focusing of a structure of interest within the identified image of the specimen;
   and centering of the structure of interest within the image of the specimen.

* * * * *